US005743141A

United States Patent [19]

Forsyth

[11] Patent Number: 5,743,141
[45] Date of Patent: Apr. 28, 1998

[54] COMPACT TRANSAXLE

[75] Inventor: John R. Forsyth, Romeo, Mich.

[73] Assignee: New Venture Gear, Inc., Troy, Mich.

[21] Appl. No.: 726,885

[22] Filed: Oct. 4, 1996

[51] Int. Cl.$^6$ ............................................. F16H 3/087
[52] U.S. Cl. ............................... 74/331; 74/325; 74/333
[58] Field of Search .......................... 74/325, 329, 330, 74/331, 333

[56] References Cited

U.S. PATENT DOCUMENTS

| | | | |
|---|---|---|---|
| 4,145,935 | 3/1979 | Herlizek | 74/325 |
| 4,463,622 | 8/1984 | Freiburger | 74/331 |
| 4,558,607 | 12/1985 | Szodfridt | 74/339 |
| 4,640,141 | 2/1987 | Knodel et al. | 74/357 |
| 4,738,149 | 4/1988 | Janiszewski | 74/331 |
| 4,738,150 | 4/1988 | Miner | 74/359 |
| 4,776,227 | 10/1988 | Janiszewski | 74/331 |
| 4,799,395 | 1/1989 | Janiszewski | 74/331 |
| 4,802,373 | 2/1989 | Saint-Jean et al. | 74/331 X |
| 5,079,965 | 1/1992 | Leber et al. | 74/325 X |
| 5,311,789 | 5/1994 | Henzler et al. | 74/331 X |
| 5,385,065 | 1/1995 | Hofmann | 74/331 |
| 5,458,015 | 10/1995 | Mauritz | 74/329 |
| 5,479,835 | 1/1996 | Esparsa et al. | 74/331 |
| 5,495,775 | 3/1996 | Lees et al. | 74/331 |

FOREIGN PATENT DOCUMENTS

2081825  2/1982  United Kingdom .

*Primary Examiner*—Khoi Q. Ta
*Attorney, Agent, or Firm*—Harness, Dickey & Pierce, P.L.C.

[57] ABSTRACT

A compact manual transaxle includes an input shaft having four fixed input gears, a first intermediate shaft rotatably supporting three speed gears meshing with three of the input gears, a second intermediate shaft rotatably supporting a pair of speed gears meshed with two of the input gears and a reverse gear meshed with a speed gear on the first intermediate shaft, and a differential. One speed gear on each of the intermediate shafts meshes with a common input gear. A transfer gear on each intermediate shaft is meshed with a final drive gear fixed to the differential. The transaxle further includes a pair of synchronizer clutches for establishing three forward gears by selectively coupling the three speed gears to the first intermediate shaft and a pair of synchronizer clutches for establishing two forward gears and the reverse gear by selectively coupling the speed gears and reverse gear to the second intermediate shaft.

15 Claims, 6 Drawing Sheets

COMPACT TRANSAXLE

BACKGROUND OF THE INVENTION

This invention relates generally to manual multi-speed transmissions of the type used in motor vehicles. More specifically, the present invention is directed to a compact manual transaxle having a synchronized reverse gear.

Due to increasing consumer demand for front wheel drive vehicles with more powerful yet fuel-efficient drivetrains, the engine and transaxle must be efficiently packaged to take advantage of all available space within the engine compartment. Concomitantly, most modern transaxles must be capable of providing at least forward five speed ratios. As such, minimizing the overall axial length of the transaxle as well as its shaft center distances is of critical importance to the transmission designer. To meet these requirements, various "three-shaft" type transaxles have been developed that include an input shaft and a pair of output shafts each having an output pinion meshed with a drive gear fixed to the differential. A series of gearsets provided between the input shaft and one or both of the output shafts can be selectively engaged to deliver power from the input shaft to a pair of axle half-shafts secured to the differential. For example, U.S. Pat. Nos. 5,311,789, 5,385,065 and 5,495,775 each disclose this type of transaxle.

A problem associated with this type of transaxle relates to the requirement that both of the output shafts be positioned "out-of-plane" relative to the plane extending through the input shaft and the differential. In particular, in order to maintain the center distance between the input shaft and the differential required for adequate driveshaft clearance, the transaxle's input shaft/output shaft center distance and its output shaft/differential center distance must be increased. This results in added geartrain mass and cost while also requiring increased synchronizer capacity.

Accordingly, while such conventional manual transaxle designs attempt to address the packaging requirements mentioned above, a need still exists for development of more compact and robust manual transaxles that can meet the demands of modern front wheel drive vehicular applications.

SUMMARY OF THE INVENTION

The primary object of the present invention is to provide a multi-speed manual transaxle that meets the above-noted needs and improves upon conventional designs.

To this end, the present invention is directed to a five-speed manual transaxle comprised of an input shaft, an output shaft having an output gear fixed thereto, a first input gear fixed to the input shaft, a first speed gear rotatably supported on the output shaft and meshed with the first input gear, a second input gear fixed to the input shaft, a second speed gear rotatably supported on the output shaft and meshed with the second input gear, a first synchronizer clutch for selectively coupling either of the first and second speed gears to the output shaft, a third input gear fixed to the input shaft, a third speed gear rotatably supported on a first intermediate shaft and meshed with the third input gear, a fourth input gear fixed to the input shaft, a fourth speed gear rotatably supported on the first intermediate shaft and meshed with the fourth input gear, a second synchronizer clutch for selectively coupling either of the third and fourth speed gears to the first intermediate shaft, a fifth input gear rotatably supported on the input shaft, a fifth speed gear fixed to the output shaft and meshed with the fifth input gear, a third synchronizer clutch for selectively coupling the fifth input gear to the input shaft, a first transfer gear fixed to the first intermediate shaft and meshed with the fifth input gear, a second intermediate shaft having a second transfer gear fixed thereto, a reverse idler gear meshed with the second transfer gear and the fifth input gear, a reverse gear rotatably supported on the second intermediate shaft and meshed with one of the input gears fixed to the input shaft, a fourth synchronizer clutch for selectively coupling the reverse gear to the second intermediate shaft, a final drive gear meshed with the output gear, and a differential driven by the final drive gear.

In accordance with an alternative embodiment, the transaxle described above can be provided in a six-speed version by additionally including a sixth input gear that is rotatably supported on the input shaft and in constant mesh with a sixth speed gear fixed to the output shaft, and wherein the third synchronizer clutch is further operable for selectively coupling the sixth input gear to the input shaft.

In accordance with yet another modified embodiment, the transaxle of the present invention has the second transfer gear rotatably supported on the second intermediate shaft such that the fourth synchronizer clutch functions to selectively couple the second transfer gear to the reverse gear.

BRIEF DESCRIPTION OF THE DRAWINGS

Further objects, features and advantages of the present invention will become apparent to those skilled in the art from studying the following description and the accompanying drawings in which.

DETAILED DESCRIPTION OF THE PREFERRED EMBODIMENT

Referring now to the drawings, a manual transaxle 10 is shown that is adapted for use in front wheel drive motor vehicles. Transaxle 10 is a multi-speed arrangement having all of its forward and reverse gears synchronized and yet is efficiently packaged to provide a compact gearbox.

Figure 1:
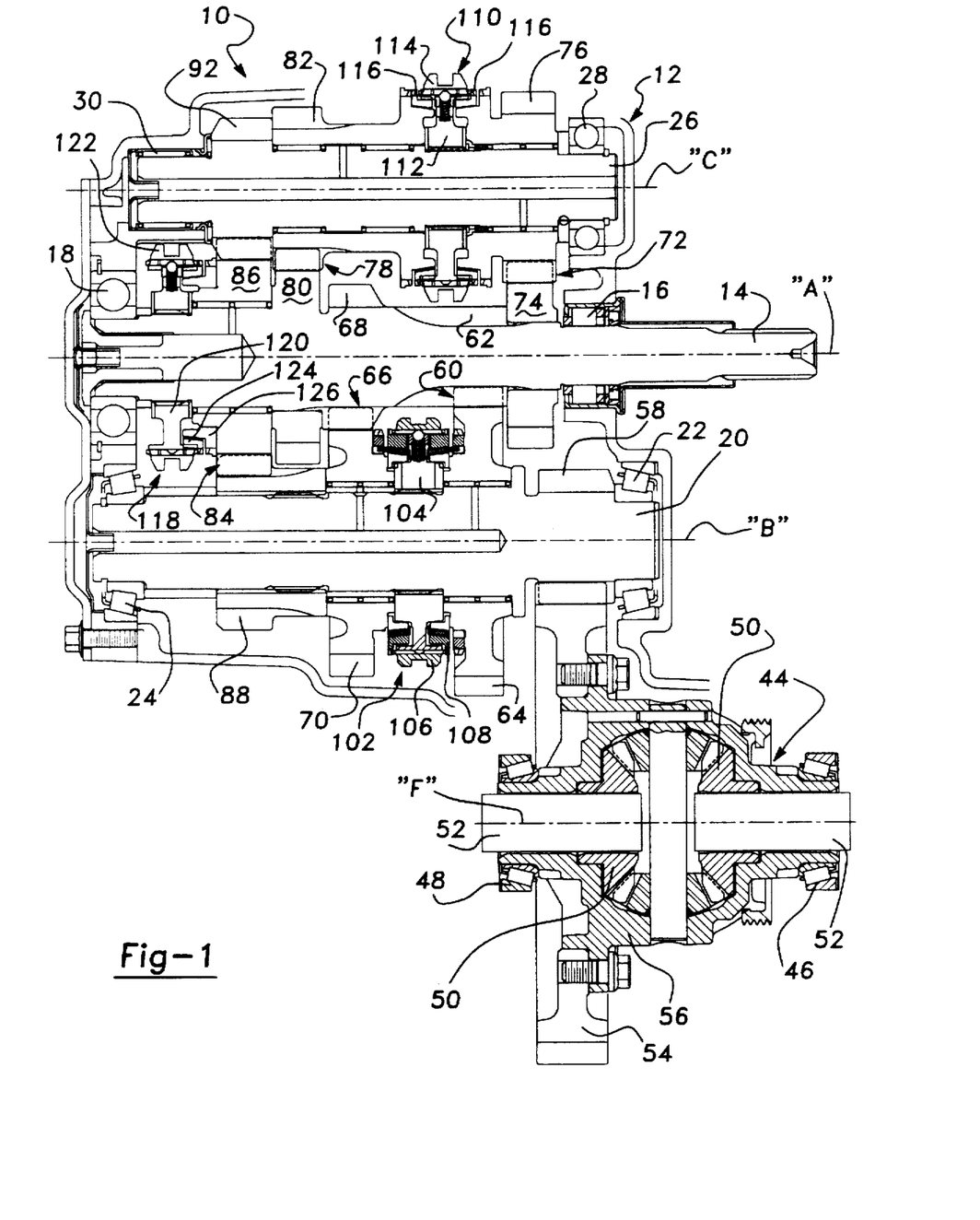
FIG. 1 is a sectional view of a five-speed manual transaxle taken along line 1—1 of FIG. 3.
Figure 2:
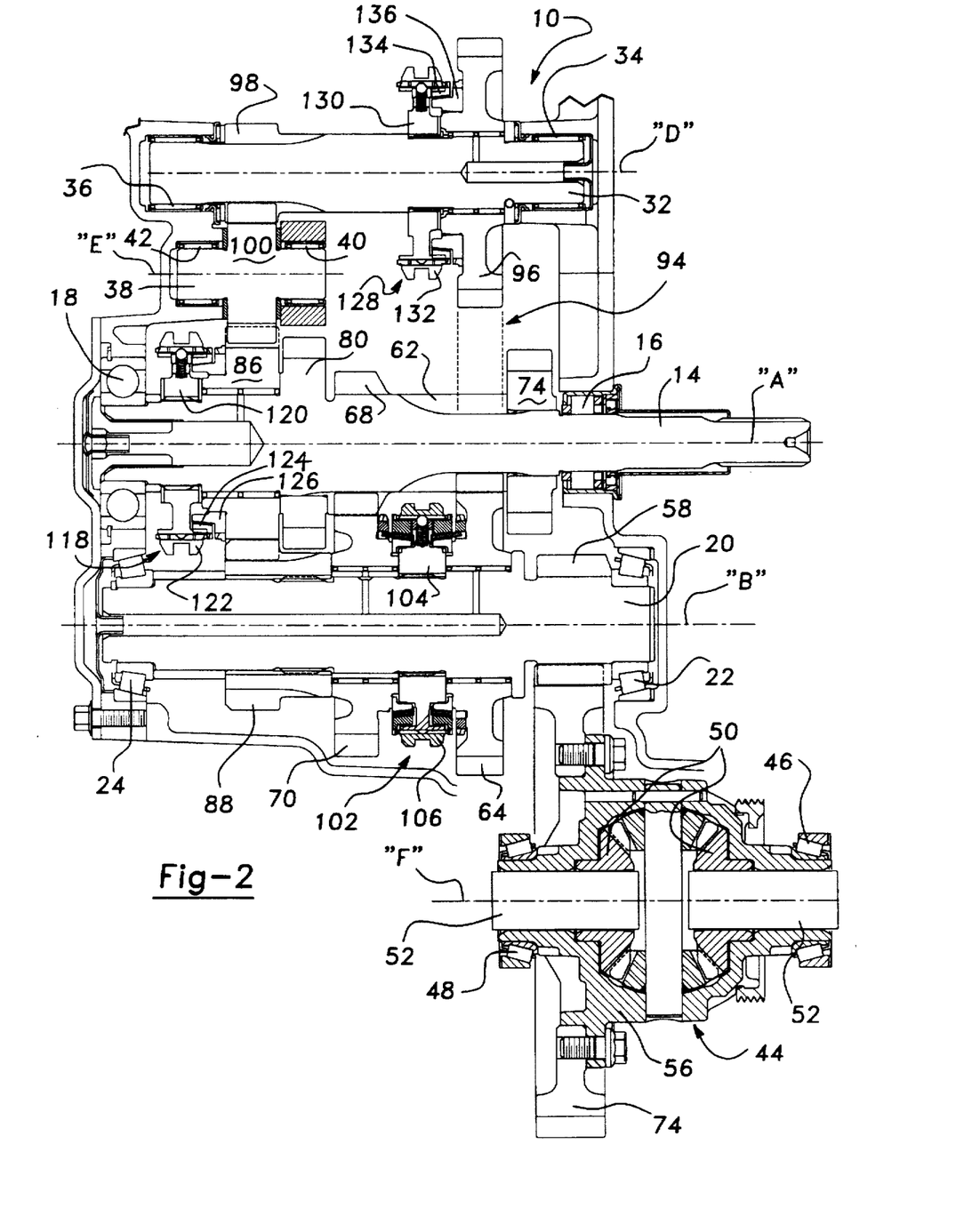
FIG. 2 is another sectional view of the five-speed manual transaxle taken along line 2—2 of FIG. 3.
Figure 3:
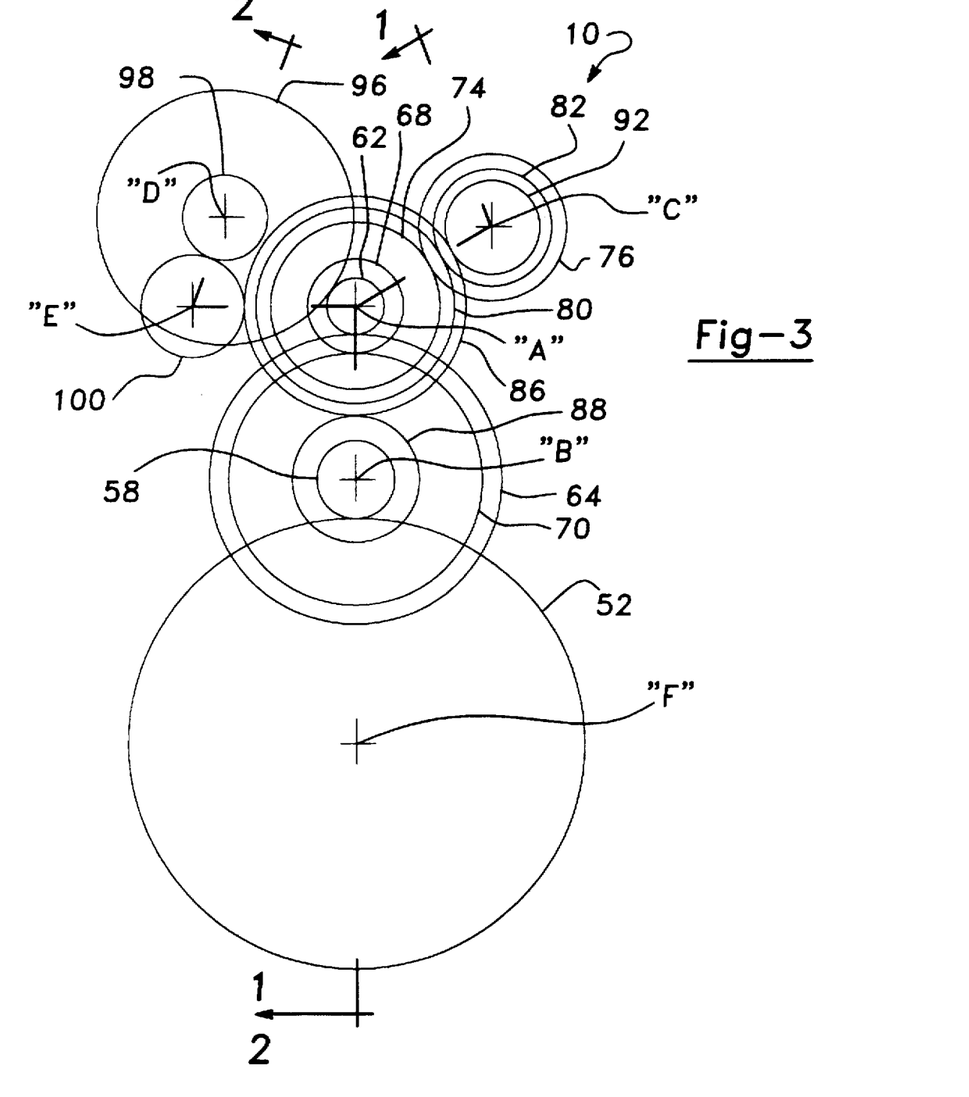
FIG. 3 is a schematic view showing the shaft and gear arrangement for the five-speed manual transaxle shown in FIGS. 1 and 2.

Transaxle 10 is shown to include a housing 12 within which an input shaft 14 is rotatably supported by bearings 16 and 18 for rotation about a first axis "A". As is conventional, input shaft 14 is adapted to be driven through a suitable manually-released clutch (not shown) by the vehicles's engine. Transaxle 10 also includes an output shaft 20 rotatably supported in housing 12 by bearing 22 and 24 for rotation about a second axis "B". In addition, transaxle 10 includes a first intermediate shaft 26 rotatably supported in housing 12 by bearings 28 and 30 for rotation about third axis "C", a second intermediate shaft 32 rotatably supported in housing 12 by bearings 34 and 36 for rotation about a fourth axis "D", a reverse idler shaft 38 supported in housing 12 by bearing 40 and 42 for rotation about a fifth rotary axis "E", and a differential 44 supported in housing 12 by bearings 46 and 48 for rotation about a sixth axis "F". The output of differential 44 includes a pair of axially-aligned side gears 50 to which axle half-shafts 52 are secured in a conventional manner so as to connect differential 44 to the driving wheels of the motor vehicle. The input to differential 44 is a drive gear 54 that is fixed to a differential cage 56 and which is in constant meshed engagement with an output gear 58 fixed to output shaft 20. It will be appreciated that FIGS. 1 and 2 are so-called "unrolled" sectional views wherein shafts 14, 20, 26, 32, 38 and 52 are all shown to be arranged in a single plane. However, in reality, these shafts are compactly arranged in a parallel relationship relative to each other, with the rotary axes for shafts 14, 20 and 52 aligned in a common plane, as is shown in FIG. 3. In addition, first and second intermediate shafts 26 and 32 are oriented to be substantially parallel with respect to one another and offset relative to input shaft 14. Since output shaft 20 is located in a common plane with input shaft 14 and differential 44, the center distances between these shafts can be effectively minimized.

Transaxle 10 includes a series of constant-mesh gearsets that can be selectively engaged for establishing five forward speed ratios as well as a reverse speed ratio between input shaft 14 and output shaft 20. In this regard, gearset 60 is shown to include a first input gear 62 fixed to input shaft 14 and a first speed gear 64 rotatably supported on output shaft 20. First speed gear 64 is in constant mesh with first input gear 62 for defining a first power transmission path that can be selectively engaged to establish a first forward speed ratio. In a similar manner, gearset 66 includes a second input gear 68 fixed to input shaft 14 that is in constant mesh with a second speed gear 70 rotatably supported on output shaft 20. Thus, gearset 66 defines a second power transmission path that can be selectively engaged to establish a second forward speed ratio. Gearset 72 includes a third input gear 74 fixed to input shaft 14 that is in constant mesh with a third speed gear 76 rotatably supported on first intermediate shaft 26. As such, gearset 72 defines a third power transmission path that can be selectively engaged to establish a third forward speed ratio. Gearset 78 includes a fourth input gear 80 fixed to input shaft 14 that is in constant mesh with a fourth speed gear 82 rotatably supported on first intermediate shaft 26. Thus, gearset 78 defines a fourth power transmission path that can be selectively engaged to establish a fourth forward speed ratio. Gearset 84 includes a fifth input gear 86 rotatably supported on input shaft 14 that is in constant mesh with a fifth speed gear 88 fixed to output shaft 20. Gearset 84 defines a fifth power transmission path that can be selectively engaged to establish a fifth forward speed ratio. In addition, gearset 84 also functions to provide a means for transferring drive torque from first intermediate shaft 26 to output shaft 20. Specifically, a first transfer gear 92 is fixed to first intermediate shaft 26 and is in constant mesh with fifth input gear 86. Finally, gearset 94 includes a reverse gear 96 rotatably supported on second intermediate shaft 32 that is in constant mesh with first input gear 62 (as shown by phantom lines in FIG. 2). As such, gearset 94 defines a sixth power transmission path that can be selectively engaged to reverse the direction of rotation of output shaft 20 and establish the reverse speed ratio. To provide means for transferring drive torque from second intermediate shaft 32 to output shaft 20, a second transfer gear 98 is fixed to second intermediate shaft 32 and is in constant mesh with a reverse idler gear 100 fixed to idler shaft 38 which, in turn, is in constant mesh with fifth input gear 86.

To provide means for establishing the various forward and reverse speed ratios between input shaft 14 and output shaft 20 by selectively engaging one of the six available power transmission paths, each gearset is associated with a synchronizer clutch. In particular, a first synchronizer clutch 102 is operably located between first and second speed gears 64 and 70 and includes a hub 104 fixed to output shaft 20, a shift sleeve 106 mounted for rotation with and axial sliding movement on hub 104, and a pair of suitable synchronizers 108 interposed between shift sleeve 106 and speed gears 64 and 70. First synchronizer clutch 102 is of the double-acting variety such that forward axial movement of shift sleeve 106 from its centered neutral position shown is adapted to releasably couple first speed gear 64 to output shaft 20 for engaging the first power transmission path and establishing the first forward speed ratio. Moreover, rearward axial movement of shift sleeve 106 from its neutral position is adapted to releasably couple second speed gear 70 to output shaft 20 for engaging the second power transmission path and establishing the second forward speed ratio.

To establish the third and fourth forward speed ratios, a second synchronizer clutch 110 is located between third and fourth speed gears 76 and 82 and includes a hub 112 fixed to first intermediate shaft 26, a shift sleeve 114 mounted for rotation with and axial sliding movement on hub 112, and a pair of synchronizers 116. Second synchronizer clutch 110 is also of the double-acting type such that forward movement of shift sleeve 114 from its centered neutral position shown is adapted to releasably couple third speed gear 76 to first intermediate shaft 26 for engaging the third power transmission path, whereby first transfer gear 92 drives output shaft 20 through gearset 84 for establishing the third forward speed ratio. Similarly, rearward movement of shift sleeve 114 from its neutral position is adapted to releasably couple fourth speed gear 82 to first intermediate shaft 26 for engaging the fourth power transmission path, whereby transfer gear 92 again drives output shaft 20 through gearset 84 for establishing the fourth forward speed ratio.

To establish the fifth forward speed ratio, a third synchronizer clutch 118 is located adjacent to fifth input gear 86 and includes a hub 120 fixed to input shaft 14, a shift sleeve 122 mounted for rotation with and axially sliding movement on hub 120, and a synchronizer 124 interposed between shift sleeve 122 and a clutch gear 126 fixed to fifth input gear 86. Forward sliding movement of shift sleeve 122 from its centered neutral position shown is adapted to releasably couple fifth input gear 86 to input shaft 14 for engaging the fifth power transmission path, whereby output shaft 20 is driven through gearset 84 for establishing the fifth forward speed ratio.

The reverse speed ratio is established via a fourth synchronizer clutch 128 that is located adjacent to reverse gear 96. Fourth synchronizer clutch 128 includes a hub 130 fixed to second intermediate shaft 32, a shift sleeve 132 mounted for rotation with and axial sliding movement on hub 130, and a blocker-type synchronizer 134 interposed between shift sleeve 132 and reverse gear 96. Forward sliding movement of shift sleeve 132 from its centered neutral position shown is adapted to releasably couple a clutch gear 136 fixed to reverse gear 96 to second intermediate shaft 32, whereby second intermediate shaft 32 is driven by input shaft 14. As such, second transfer gear 98 drives idler gear 100 which, due to its constant meshed engagement with fifth input gear 86, drives output shaft 20 through gearset 84 for establishing the reverse gear ratio.

When the first forward gear is established, drive torque is delivered from input shaft 14 to differential 44 through elements 62, 64, 106, 104, 20, 58 and 54. When the second forward gear is established, drive torque is delivered from input shaft 14 to differential 44 through elements 68, 70, 106, 104, 20, 58 and 54. When the third forward gear is established, drive torque is delivered from input shaft 14 to differential 44 through elements 74, 76, 114, 112, 26, 92, 86, 88, 20, 58 and 54. When the fourth forward gear is established, drive torque is delivered from input shaft 14 to differential 44 through elements 80, 82, 114, 112, 26, 92, 86, 88, 20, 58 and 54. When the fifth forward gear is established, drive torque is delivered from input shaft 14 to differential 44 through elements 120, 122, 126, 86, 88, 20, 58 and 54. Finally, when the reverse gear is established, drive torque is delivered from input shaft 14 to differential 44 through elements 62, 96, 136, 132, 130, 32, 98, 100, 86, 88, 20, 58, and 54.

As the terms are used herein, all gears "rotatably supported" on a shaft are loosely mounted thereon using suitable bearings while all gears "fixed" to a shaft are non-rotatively mounted thereon via conventional means (i.e., splines, press-fit, welding, etc.) or are integrally formed thereon. Any suitable shift system that is operable for coupling each of shift sleeves 106, 114, 122 and 132 to a gearshift lever (not shown) to coordinate movement therebetween to establish the various forward and reverse gears can be used with transaxle 10. Moreover, the geartrain shown in transaxle 10 is arranged such that only one power transmission path is intended to be engaged at a time, with disengagement of all the power transmission paths establishing a neutral mode whereat no drive torque is transferred from input shaft 14 to output shaft 20. While it is not intended to be interpreted as being drawn to scale, FIG. 3 clearly illustrates the general relationship between the various shafts and the gear meshing associated therewith.

Figure 4:
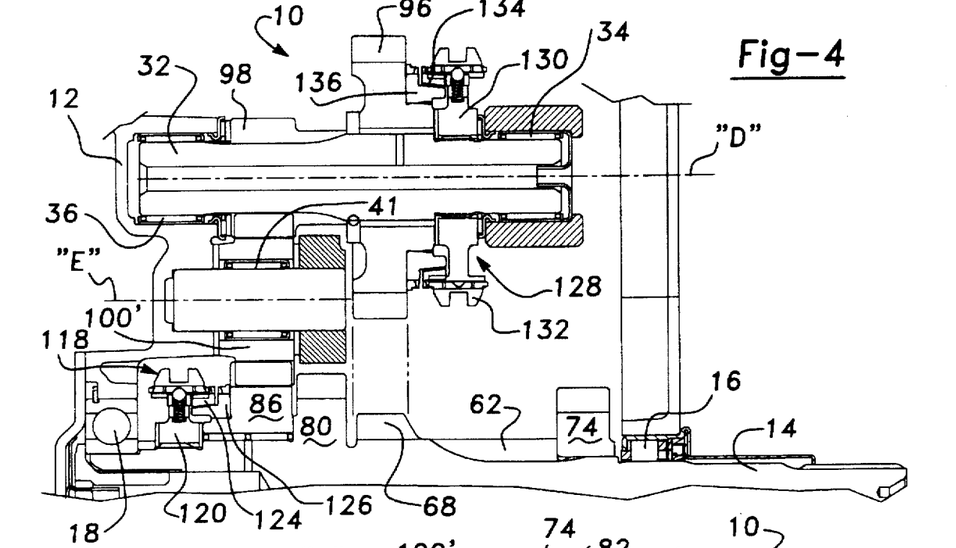
FIG. 4 is a sectional view, similar to FIG. 2, but showing the transaxle equipped with an alternative synchronized reverse gear arrangement.

Referring to FIG. 4, an alternative construction for the reverse gear arrangement in transaxle 10 is shown in which reverse gear 96 is in constant mesh with second input gear 68 (as shown by phantom lines) instead of with first input gear 62. Thus, transaxle 10 can be modified to permit reverse gear 96 to be driven by any one of the available input gears that is fixed to input shaft 14. In the embodiment shown, idler shaft 38' is fixed in housing 12 with reverse idler gear 100' rotatably supported on idler shaft 38' by bearings 41.

Figure 5:
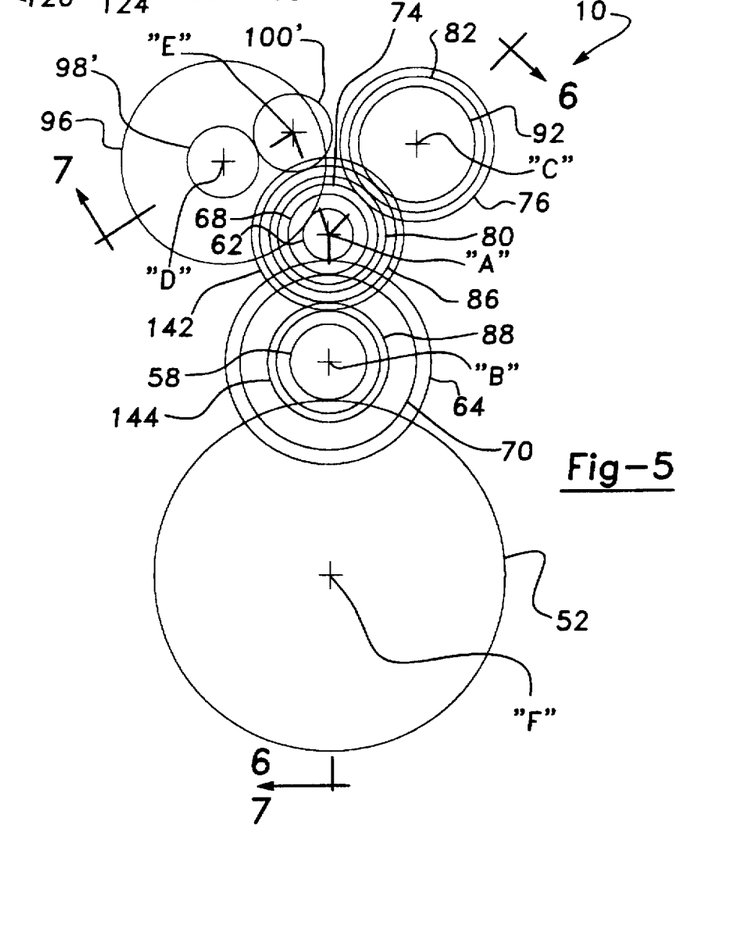
FIG. 5 is a schematic view showing the shaft and gear arrangement for a six-speed manual transaxle constructed according to an alternative preferred embodiment of the present invention.
Figure 6:
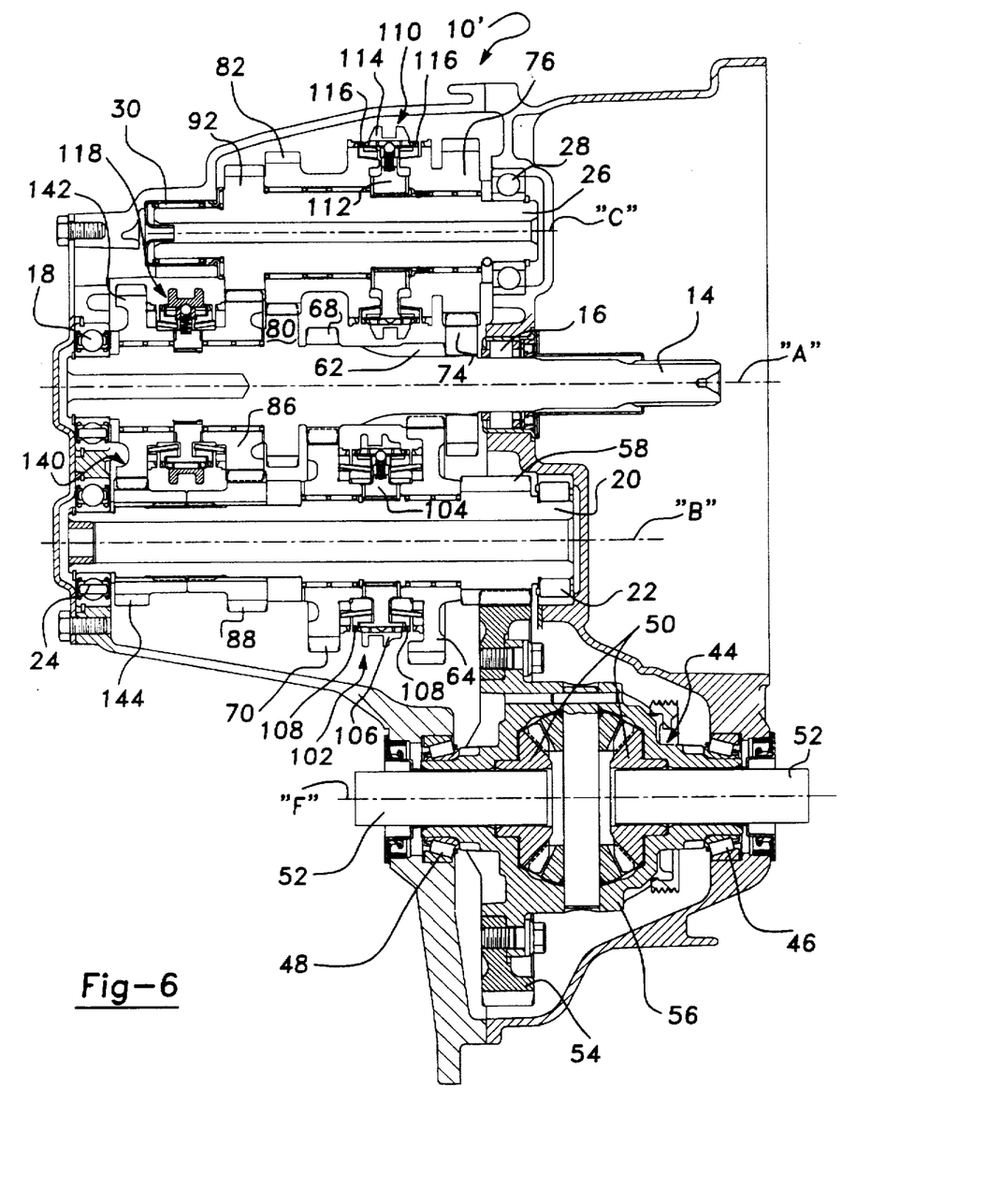
FIG. 6 is a sectional view of the six-speed transaxle taken along line 6—6 of FIG. 5.
Figure 7:
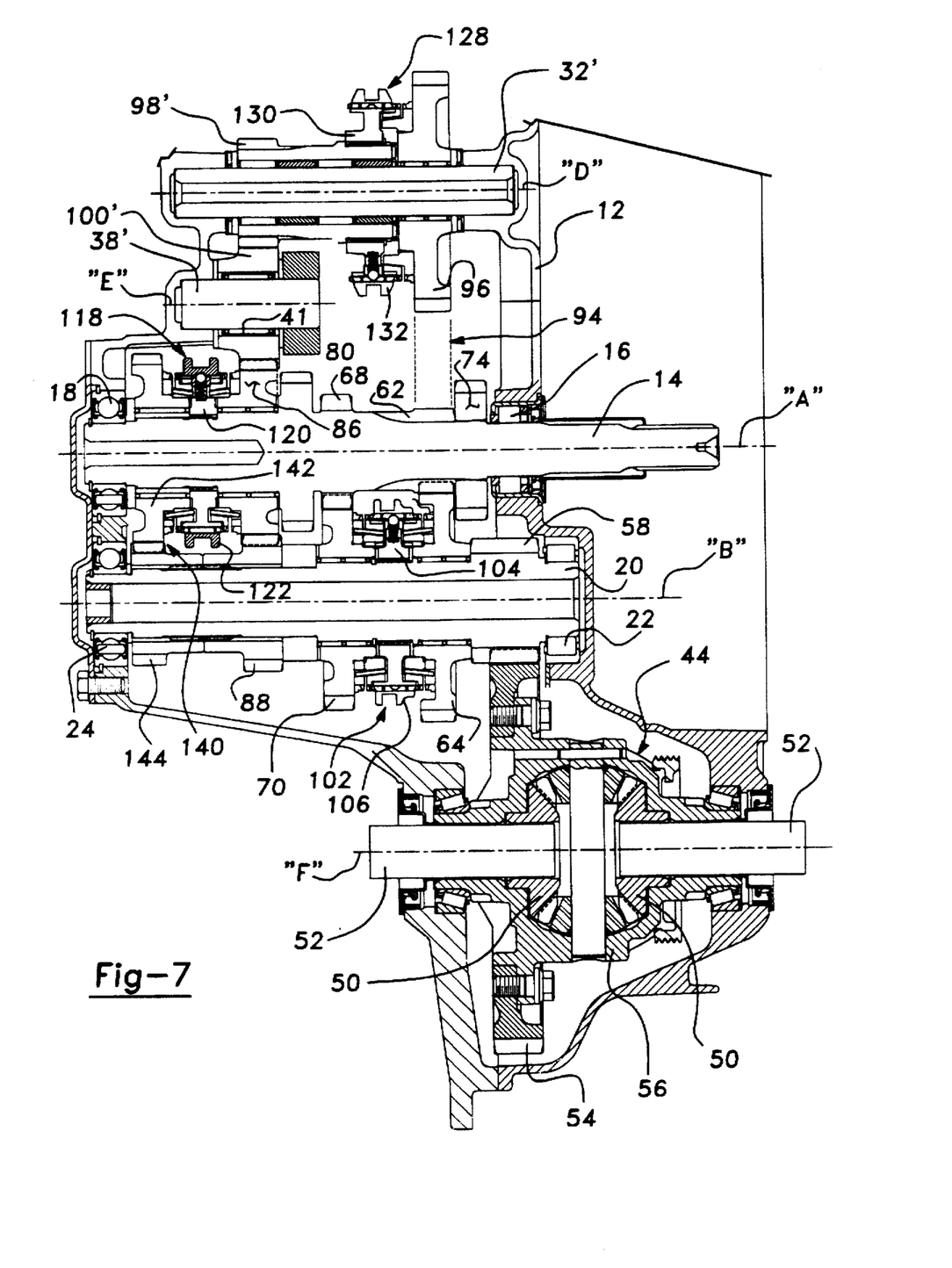
FIG. 7 is another sectional view of the six-speed transaxle taken along line 7—7 of FIG. 5.

Referring now to FIGS. 5 through 7, a transaxle 10' is shown as a six-speed arrangement with all of its forward and reverse gears synchronized. In general, transaxle 10' is substantially similar to transaxle 10 described above with the exception that an additional gearset 140 has been incorporated thereto to provide a sixth forward speed ratio. Moreover, when comparing FIG. 6 to that of FIG. 1, it can be seen that rotary axis "E" associated with the reverse idler gear has also been relocated. In view of the substantial similarity in structure and function of the components associated with transaxle 10' with respect to transaxle 10, like reference numerals are used hereinafter and in the drawings to identify like components while primed reference numerals are again used to identify those components that have been modified.

With particular reference to the sectional views shown in FIGS. 6 and 7, transaxle 10' includes a gearset 140 having a sixth input gear 142 rotatably supported on input shaft 14 that is in constant mesh with a sixth speed gear 144 fixed to output shaft 20. In addition, third synchronizer clutch 118 is now shown to be of the double-acting variety with hub 120 located between fifth input gear 86 and sixth input gear 142. In addition to the forward sliding motion of shift sleeve 122 described above for establishing the fifth forward speed ratio, shift sleeve 122 is now also movable in a rearward direction from its center neutral position for selectively coupling sixth input gear 142 to input shaft 14, whereby output shaft 20 is driven at the sixth forward speed ratio. Thus, when the sixth forward gear is established, torque is delivered from input shaft 14 to differential 44 through elements 120, 122, 142, 144, 20, 58 and 52.

In addition to the incorporation of gearset 140 into transaxle 10', a modified synchronized reverse gear arrangement is provided. In particular, FIG. 7 shows second intermediate shaft 32' to be non-rotatably fixed to housing 12 with second transfer gear 98' rotatably supported thereon adjacent to reverse gear 96. Hub 130 is shown to now be fixed to second transfer gear 98'. Thus, movement of shift sleeve 132 rearwardly from its neutral position shown causes it to couple second transfer gear 98' for rotation with reverse gear 96. This modified reverse gear arrangement could likewise be incorporated into transaxle 10 in substitution for the arrangement shown in FIG. 2.

The foregoing discussion discloses and describes preferred embodiments of the present invention. One skilled in the art will readily recognize from such discussion, and from the accompanying drawings and claims, that various changes, modifications and variations can be made therein without departing from the true spirit and fair scope of the invention as defined in the following claims. For example, the novel geartrain arrangements disclosed herein for use in the transaxles may likewise be used in a rear-wheel drive transmission wherein the differential would be removed and the output shaft would extend rearwardly for connection to the vehicle's rear driveline components.

What is claimed is:

1. A manual transmission comprising:

an input shaft;

an output shaft;

a first input gear fixed to said input shaft;

a first speed gear rotatably supported on said output shaft and meshed with said first input gear;

a second input gear fixed to said input shaft;

a second speed gear rotatably supported on said output shaft and meshed with said second input gear;

a first synchronizer clutch for selectively coupling either of said first and second speed gears to said output shaft;

a first intermediate shaft having a first transfer gear fixed thereto;

a third input gear fixed to said input shaft;

a third speed gear rotatably supported on said first intermediate shaft and meshed with said third input gear;

a fourth input gear fixed to said input shaft;

a fourth speed gear rotatably supported on said first intermediate shaft and meshed with said fourth input gear;

a second synchronizer clutch for selectively coupling either of said third and fourth speed gears to said first intermediate shaft;

a fifth input gear rotatably supported on said input shaft;

a fifth speed gear fixed to said output shaft and meshed with said fifth input gear;

a third synchronizer clutch for selectively coupling said fifth input gear to said input shaft;

a second intermediate shaft having a second transfer gear fixed thereto;

an idler gear meshed with said second transfer gear and said fifth input gear;

a reverse gear rotatably supported on said second intermediate shaft and in driven connection with said input shaft; and a fourth synchronizer clutch for selectively coupling said reverse gear to said second intermediate shaft.

2. The manual transmission of claim 1 wherein said driven connection between said reverse gear and said input shaft is established by said reverse gear meshing with one of said first and second input gears.

3. The manual transmission of claim 1 further comprising a differential driven by said output shaft.

4. The manual transmission of claim 1 wherein said first and second intermediate shafts each have a rotary axis that is aligned in a common plane offset from and parallel to a plane passing through the rotary axis of said input shaft.

5. A manual transmission comprising:

an input shaft;

an output shaft;

a first input gear fixed to said input shaft;

a first speed gear rotatably supported on said output shaft that is meshed with said first input gear;

a second input gear fixed to said input shaft;

a second speed gear rotatably supported on said output shaft that is meshed with said second input gear;

a first synchronizer clutch for selectively coupling either of said first and second speed gears to said output shaft;

a first intermediate shaft having a first transfer gear fixed thereto;

a third input gear fixed to said input shaft;

a third speed gear rotatably supported on said first intermediate shaft that is meshed with said third input gear;

a fourth input gear fixed to said input shaft;

a fourth speed gear rotatably supported on said first intermediate shaft that is meshed with said fourth input gear;

a second synchronizer clutch for selectively coupling either of said third and fourth speed gears to said first intermediate shaft;

a fifth input gear rotatably supported on said input shaft;

a fifth speed gear fixed to said output shaft that is meshed with said fifth input gear;

a third synchronizer clutch for selectively coupling said fifth input gear to said input shaft;

a second intermediate shaft having a second transfer gear rotatably supported thereon;

an idler gear meshed with said second transfer gear and said fifth input gear;

a reverse gear rotatably supported on said second intermediate shaft and in driven connection with said input shaft; and a fourth synchronizer clutch for selectively coupling said reverse gear to said second transfer gear.

6. The manual transmission of claim 5 wherein said driven connection between said reverse gear and said input shaft is established by said reverse gear meshing with one of said first and second input gears.

7. The manual transmission of claim 5 further comprising a differential driven by said output shaft.

8. The manual transmission of claim 5 wherein said first and second intermediate shafts each have a rotary axis that is aligned in a common plane offset from and parallel to a plane passing through a rotary axis of said input shaft.

9. A manual transmission comprising:

an input shaft;

an output shaft;

a first intermediate shaft;

a second intermediate shaft;

first and second constant-mesh gearsets supported between said input shaft and said output shaft;

a first synchronizer clutch for selectively engaging either of said first and second gearsets for drivably connecting said output shaft to said input shaft for establishing first and second forward speed ratios therebetween;

third and fourth constant-mesh gearsets supported between said input shaft and said first intermediate shaft;

a fifth constant-mesh gearset drivably connecting said first intermediate shaft to said output shaft;

a second synchronizer clutch for selectively engaging either of said third and fourth gearsets for drivably connecting said first intermediate shaft to said input shaft for establishing third and fourth speed ratios between said input shaft and said output shaft;

a reverse gear rotatably supported on said second intermediate shaft and in driven engagement with said input shaft;

a sixth constant-mesh gearset drivably connecting said second intermediate shaft to said fifth constant-mesh gearset; and a third synchronizer clutch for selectively coupling said reverse gear to said second intermediate shaft for establishing a reverse speed ratio between said input shaft and said output shaft.

10. The manual transmission of claim 9 wherein said fifth constant-mesh gearset includes a first transfer gear fixed to said first intermediate shaft, an input gear rotatably supported on said input shaft that is meshed with said first transfer gear, and a speed gear fixed to said output shaft that is meshed with said input gear.

11. The manual transmission of claim 10 further comprising a fourth synchronizer clutch for selectively coupling said input gear to said input shaft for establishing a fifth speed ratio between said input and output shafts.

12. The manual transmission of claim 10 wherein said sixth constant-mesh gearset includes a second transfer gear fixed to said second intermediate shaft, and an idler gear meshed with said second transfer gear and said input gear.

13. The manual transmission of claim 10 wherein said sixth constant-mesh gearset includes a second transfer gear rotatably supported on said second intermediate shaft, and an idler gear meshed with said second transfer gear and said input gear, and wherein said third synchronizer clutch is operable for selectively coupling said reverse gear to said second transfer gear.

14. The manual transmission of claim 9 wherein said sixth constant-mesh gearset includes a second transfer gear that is fixed to said second intermediate shaft, and an idler gear in constant mesh with said second transfer gear and said fifth gearset.

15. The manual transmission of claim 9 wherein said first and second intermediate shafts each have a rotary axis that is aligned in a common plane offset from and parallel to a plane passing through the rotary axis of said input shaft.

\* \* \* \* \*